Figure 1:
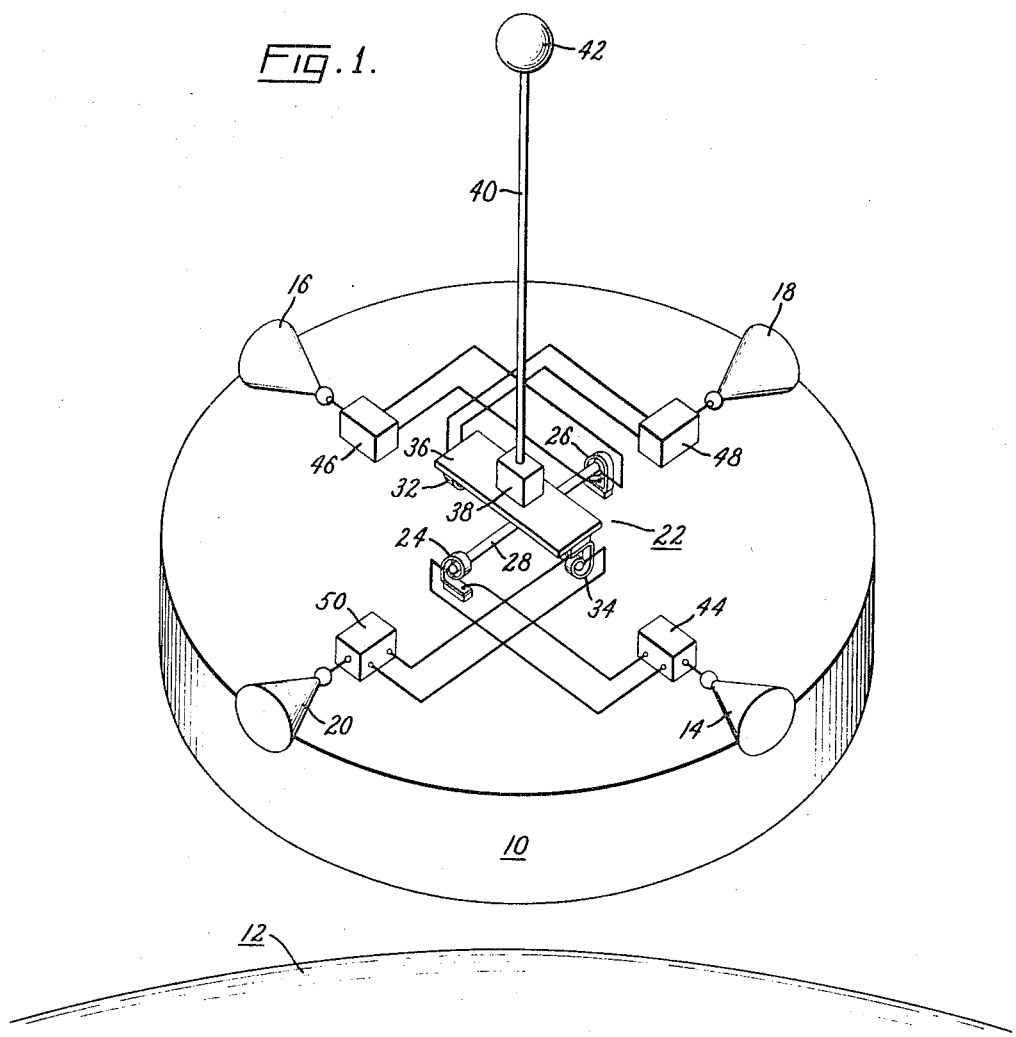

United States Patent

[15] 3,640,487

Wanger

[45] Feb. 8, 1972

[54] VERTICAL ORIENTATION DEVICE
[72] Inventor: Robert P. Wanger, Valley Forge, Pa.
[73] Assignee: General Electric Company
[22] Filed: July 13, 1967
[21] Appl. No.: 653,195

[52] U.S. Cl. ........................................................244/1 SA
[51] Int. Cl. ..............................................................B64g 1/00
[58] Field of Search ...............................................244/1 SS

[56] References Cited

UNITED STATES PATENTS 3,239,165   3/1966   Sohn..........................................244/1

OTHER PUBLICATIONS

Hatcher, Norman M.; Spacecraft Attitude Sensors—Where We Stand Today; Astronautics and Aeronautics; Dec. 1966, pp. 58-59, 63.

Roberson, Robt. E.; Attitude Control; Advances in Space Science, Vol. 2, 1960; pp. 415-419

Primary Examiner—Milton Buchler
Assistant Examiner—Jeffrey L. Forman
Attorney—Paul F. Prestia, Allen E. Amgott, Henry W. Kaufmann, Melvin M. Goldenberg, Frank L. Neuhauser and Oscar B. Waddell

[57] ABSTRACT

"Gravity-gradient" rod is connected to satellite by powered angular drive means controlled by attitude sensors which displace "gravity-gradient" rod in proper direction to produce increased torque by interaction with gravitational field to maintain satellite in desired attitude toward local gravitational gradient.

4 Claims, 2 Drawing Figures

PATENTED FEB 8 1972

3,640,487

INVENTOR:
ROBERT P. WANGER,
BY Henry W. Kaufmann
AGENT

VERTICAL ORIENTATION DEVICE

This invention pertains to the art of stabilizing space satellites with respect to the local vertical. It is known in the prior art to stabilize a space vehicle with respect to the local vertical by making the moments of inertia around each of two orthogonal axes of the vehicle appreciably larger than that around a third axis orthogonal thereto. This causes the vehicle, in a gravitational field, to tend to assume an attitude such that the third axis is aligned with the local vertical, i.e., to the vector gradient of gravity, whose direction defines the local vertical. This is commonly achieved by extending from the vehicle a long rodlike structure, longer than any dimension of the vehicle, which, despite small mass, may have large moment of inertia because of large radius of gyration, and which may be provided with a damping device to damp oscillations of the vehicle around its preferred position. While such damping devices are highly satisfactory in damping oscillations, and vehicles thus stabilized show great stability, the gravity-gradient stabilization system has the characteristic of most self-nulling passive systems that the torque tending to restore the vehicle to its desired attitude decreases continuously as the vehicle approaches that attitude. Because various periodic and random torques tend to displace from its desired attitude a satellite in orbit around the earth, this smallness of torque when the vehicle is nearly but not quite at its desired attitude keeps the vehicle from following the angular variations in the local vertical so rapidly and hence so accurately as would be desirable. In consequence of this, a vehicle stabilized in attitude solely by gravity-gradient means, however well damped, shows displacements from its desired attitude to the local vertical which are great enough to be detected by attitude sensors of the known art, such as infrared sensors. Also, the long, slender rodlike structures commonly used for gravity-gradient stabilization tend to bend under nonuniform heating from one-sided exposure to the sun, so that the actual direction of the center of mass of the rod from its point of attachment is not that which would be deduced from the orientation of the rod end at its point of attachment to the vehicle. This, obviously, will produce a systematic error in a system which relies for its functioning upon the validity of such a deduction.

It is an object of my invention to provide gravity-gradient stabilization means which provide accuracy of attitude control to the local vertical which is greater than that obtainable by purely passive means, and which employs attitude errors detected by attitude sensors to correct such errors.

To this end I provide otherwise conventional gravity-gradient stabilization means with power-driven torque means to alter the angular position (that is, tilt) of the gravity-gradient means with respect to the vehicle, responsively to attitude errors sensed by sensing means. In one embodiment of my invention, a two-axis gimbal drive is so connected to attitude sensing means that, when the vehicle tilts toward a given azimuthal direction, an extended gravity-gradient rod is caused to tilt, relative to the vehicle, in the opposite direction. In a conventional gravity-gradient stabilized vehicle, with fixedly attached rod, the tilting of the vehicle will cause a tilt of the rod through an equal angle, and will thus produced a correcting torque proportional, for small angles, to the magnitude of the vehicle's tilt, or axial angular displacement from the vertical. But my invention causes the rod to move by an angle which is a multiple greater than one of the tilt angle, and thus produces, by interaction with the local gravitational field, a torque which is proportionately greater than that producible by a purely passive system.

The movement of the rod may be made to depend exclusively upon the sensed deviations from desired attitude, in closed-loop servo fashion, without dependence upon any a priori assumption that the direction in which the rod points at its connection to the vehicle is the direction to its center of mass. Consequently it is not necessary to predict any thermal or other bending.

Since the moment of inertia of the rod may, because of its length, be comparable with that of the more massive but more compact vehicle, the attitude of the vehicle may be corrected as rapidly as the power of the rotational means permits by rotating the rod through an angle sufficient to rotate the vehicle to its proper attitude. In view of Newton's third law, the angles through which the vehicle and the rod rotate will be opposite in sign and inversely proportional in magnitude to their respective moments of inertia about their common point of rotation. Thus, given an initial vehicle tilt, the rapid corrective action may leave the vehicle itself correctly oriented, but its rod out of line with the local vertical. Since the combination of vehicle and rod will ordinarily be designed so that the vehicle is stable in its desired orientation when the rod is aligned with the local vertical, this deviation of the rod from alignment with the local vertical will leave the vehicle in a condition which is unstable, in that the gravity gradient will act upon the vehicle-rod combination so as to tilt the vehicle, if the rod angle with respect to the vehicle remains unchanged. It is possible, given the parameters of the vehicle and the rod, to calculate the rate at which the rod should be rotated back into alignment with the vertical to restore it to a stable position without tilting the vehicle; and to provide a control computer to control the powered rotating means to rotate the rod at this rate. However, this would require either that the rod be free from bending or that some means (such as thermocouples located to sense the temperatures at various portions of the rod) be provided to determine the rod bending and provide a correcting input to the computer. While this procedure might be desirable in special situations, it is not worth while ordinarily for the practical reason that the accuracy with which the vehicle is oriented, in the practice of my invention, will be determined by the accuracy of the attitude sensors. There is, therefore, little to be gained by providing special means to preserve an attitude which may be in error by any error inherent in the sensors. It is simpler, and usually quite as satisfactory, to allow the rod to remain out of line with the local vertical until this misalignment causes the vehicle to tilt by an amount detectable by the attitude sensors, in which case they will cause the rod to move by an amount sufficient to correct the detected tilt. Thus, like any closed-loop servosystem, the system will approach its final position by means of measurements of its own performance. Operation in this mode has the further advantage that it automatically adapts itself to situations in which external forces (such as solar radiation pressure, or the action of the ambient magnetic field) tend to tilt the vehicle so that the rod-vehicle system is actually stable with the rod out of line with the local vertical.

Figure 2:
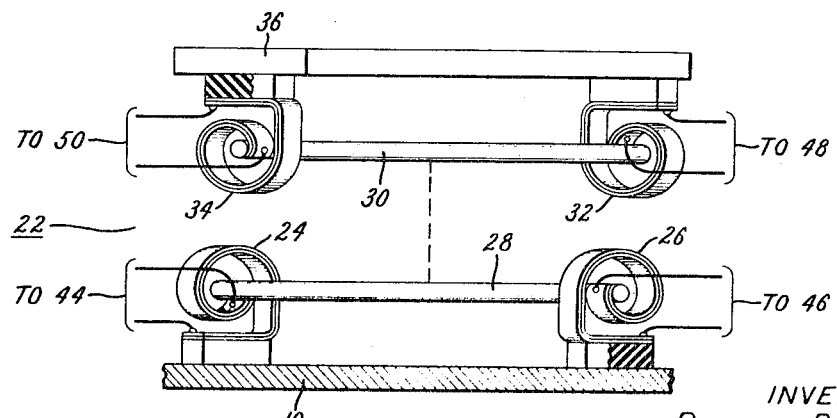

For the better understanding and explanation of my invention I have provided figures of drawing, in which FIG. 1 represents schematically the elements of an embodiment of my invention in a vehicle in orbit around the earth, and FIG. 2 represents schematically a torque gimbal suitable for use in an embodiment of my invention.

Referring to FIG. 1, there is represented a vehicle body 10 in orbit above the partially represented earth 12. Schematically represented by conical hoods are sensors 14 and 16, located diametrically opposite each other, and sensors 18 and 20, located diametrically opposite each other along a line at right angles to that between sensors 14 and 16. These sensors may comprise thermopiles or semiconductor devices sensitive to infrared radiation from the earth, having associated with them optical systems so designed and oriented that, when the satellite is at the height above the earth at which it is intended to operate, each sensor views the horizon of the earth and a part of space above the earth. Since the earth radiates readily detectable amounts of infrared energy, while space does not, the total amount of energy received by each sensor at a given altitude will be dependent upon the tilt of the satellite, which determines what fraction of the sensor's field of view is filled by the earth, the remainder of the field of view being filled by space. Thus, when the satellite is properly oriented with respect to the earth, each of sensors 14, 16, 18, and 20 will receive an equal amount of infrared energy and will produce an equal output signal indicative thereof. Devices such as these, and more sophisticated versions thereof (cf. U.S. Pat. No. 3,020,407) are well known in the art. They suffer from the disadvantage that when the satellite is in such a position with respect to the earth and the sun that the sun is seen at or near the horizon, the sensor will give an erroneous indication. Various means are known to prevent the sensors from functioning under these conditions; for example, advantage may be taken of the fact that the output of a sensor viewing the sun will be much greater than that produced by viewing the earth alone, and circuitry may be provided which will disconnect both the sensor viewing the earth and its diametric opposite so long as the excessively great output of one of them indicates that the sun is in view. Alternatively, a blind or shade may be caused by the excessively great signal or other suitable detecting means to pass in front of the sensor and its opposite while the sun is in the field of view of either one. This will inactivate any system dependent upon the operation of the sensors; but the length of time that the sun is in view of the sensor may be made sufficiently brief, by suitably limiting the field of view of the sensor's optical system, that the vehicle will not have sufficient time to deviate very much from its desired attitude, since both the disturbing torques and the correcting torques are so small relative to the moments of inertia of the vehicle that the period of oscillation of the system is rather long compared with the time envisaged. Still another alternative is to provide additional sensors aimed at points on the horizon not occupied by the sun, and to connect to these when the magnitude of signal from a given sensor indicates that it is viewing the sun.

In the center of the vehicle body there is represented a two-axis powered torquing device 22, which may conveniently be a bimetallic electrically heated device. Such an embodiment includes two bimetallic spirals 24 and 26 which are connected to a cross-shaft 28. Spirals 24 and 26 are so arranged that, when the temperature of both is changed by the same amount, they will produce equal torques tending to drive shaft 28 is opposite directions, in consequence of which it will not turn. If, however, one such spiral is heated to a temperature higher than that of the other, as by passing an electric current through it, or through a heating winding in close proximity to it, the heated spiral will produce a torque which will be greater than that produced by the other, unheated spiral, and will turn shaft 28 until the torque of the unheated spiral is increased by the turning to a value equal to that of the heated spiral. Such a thermal motor has the advantage that it does not require sliding bearings (which may be difficult to lubricate in the cold and vacuum of space) and it is not subject to static friction, which tends to produce somewhat jerky operation. While its operation is slow compared with the speed of operation of conventional motors, it is amply fast for the purposes of my invention. Also, by making the bimetal elements sufficiently large, they may be made of high torque without the necessity of employing gear reductions or of using excessively high currents or any magnetic structure. The thermal motor is also particularly well adapted to operation over a small angle. Thus, while other conventional drive means may be employed in its stead, I prefer the thermal motor for my embodiment, as represented pictorially in FIG. 2.

Connected to shaft 28, and at right angles to it, is another cross-shaft 30, to which are connected bimetal spirals 32 and 34, similar to bimetal spirals 24 and 26 and, like them, arranged so that equal changes in the temperature of both will cause them to produce equal and oppositely directed torques. The ends of spirals 32 and 34 not connected to shaft 30 are firmly fixed to plate 36 so that such equal and opposite torques will not permit them to rotate with respect to shaft 30, but unequal heating of spirals 32 and 34 will produce a net rotation. It is thus evident that, by suitable selective heating of appropriate ones of spirals 24, 26, 32, and 34, plate 36 may be tilted around two orthogonal axes identical with the axes of cross-shafts 28 and 30 and thus, within the constraints produced by mechanical interference, may tilt in any direction.

Upon plate 36 there is mounted a motor-driven reel 38, which serves in accordance with the known art to store, in rolled condition during launching, a prestressed metal strip 40 which, after the vehicle 10 is placed in orbit, is unrolled by operation of the motor of reel 38 to extend, being caused by its prestressed condition to form a tubular structure which extends like a rod, and is usually referred to in the language of the art as a gravity-gradient rod. A damper 42 to damp oscillations is usually conventionally attached to such a rod and is here represented.

Thus far there have been described a system of sensors capable of sensing the attitude of the vehicle 10 with respect to the earth's horizons, and a powered torquing device 22 carrying a gravity-gradient rod which can alter the angle between the rod 40 and the vehicle body 10. It remains to describe the electrical system which causes the indications of the sensors to control the angle of rod 40 to the vehicle body 10 appropriately to the practice of my invention. It should be noted expressly, what is already implicit, that the control of vehicle attitude with respect to the earth's horizons is a sufficiently good approximation to control with respect to the local vertical that the two are regarded in the art as equivalent; the earth is sufficiently near to being a perfect sphere so that differences between the two are within the ordinary limits of accuracy of stabilization. A simple electrical system for carrying out my invention is comprised by four identical amplifiers, which may be semiconductor devices, whose inputs are adapted to receive the outputs of the sensors, and responsively thereto to produce currents at voltages suitable to apply to heat the bimetal spirals to cause them to produce torques. As represented by rectangles (their design being well within the conventions of the known art), amplifier 44 has its input connected to sensor 14 and its output to spiral 24; amplifier 46 has its input connected to sensor 16 and its output to spiral 26. Similarly, amplifier 48 is connected appropriately between sensor 18 and spiral 32, and amplifier 50 between sensor 20 and spiral 34. Since the direction of torque produced by heating a bimetallic spiral depends upon the difference in coefficients of thermal expansion of the inner and outer metals forming the bimetals, which difference may be of either sign; and since amplifiers may be designed to produce either an increased or a reduced current output with increasing input, the required relation may most simply be defined by the statement that an increase in the infrared input to a sensor should tend to cause rod 40 to tilt in the direction of that sensor. Such tilting will produce a reaction on the vehicle 10 body which will tend to cause the given sensor to raise its angle of view above the horizon, thus reducing the amount of infrared it receives from the earth. If two opposed sensors, such as 14 and 16, receive equal amounts of infrared, indicating that vehicle 10 is properly oriented around the axis of shaft 28, amplifiers 44 and 46 will receive equal inputs, will produce equal outputs to similar but opposed bimetallic spirals 24 and 26, which will produce equal and opposed torques, and will not rotate rod 40 around the axis. Similarly equality of infrared inputs to sensors 18 and 20 will produce equal and opposed torques on shaft 30, and rod 40 will not be rotated around the axis of shaft 30. Any inequality in the irradiation of two opposed sensors, such as 14 and 16, or 18 and 20, will cause inequality in the torques applied to opposite ends of the appropriate cross-shaft, 28 or 30, and will result in a tilt of rod 40 in the appropriate direction to correct the unbalance.

To summarize, there have been disclosed attitude sensing means (14, 16, 18, 20) connected to control means (44, 46, 48, 50) to cause powered torque means (22) to adjust the relative angle between two parts (10, 40) of a vehicle system responsively to the indications of the attitude sensing means (14, 16, 18, 20) to adjust to a predetermined attitude the part (10) of the vehicle system whose attitude is sensed by the sensing means (14, 16, 18, 20).

More particularly, the powered torque means (22) may comprise opposing pairs (24 and 26, or 32 and 34) of torque devices, one member of a pair being separately responsive to the indication of one of a pair (14 and 16, or 18 and 20) of oppositely directed sensors, whereby the net rotation produced by such a pair of opposed torque devices is determined by the difference between the parameters sensed by the members of the pair of oppositely directed sensors.

In the particular embodiment disclosed, the sensors are infrared radiation sensors, and the torque devices are thermal motors. Further, the part 40 of the vehicle system is a rodlike structure adapted to be stored in a coiled or rolled condition, and is equipped with mechanical oscillation damping means (42).

I claim:

1. In a space vehicle comprising:
a vehicle body having a given mass and
a gravity-gradient rod of mass less than the said given mass, connected at one of its ends to the said vehicle body, of length greater than any dimension of the vehicle body, extending away from the vehicle, and adapted to align itself with the local gradient of gravity,
the improvement comprising:
attitude sensing means to sense the attitude of the vehicle body with respect to a reference;
powered torque means forming the connection between the said vehicle body and the said one end of the gravity-gradient rod, operatively connected to the said attitude sensing means to displace the said gravity-gradient rod angularly with respect to the said vehicle body responsively to and in the direction of an attitude deviation of the vehicle body with respect to the said reference sensed by the said attitude sensing means.

2. The device claimed in claim 1 in which to said powered torque means comprises a pair of separately powered torque devices producing opposing torques.

3. The device claimed in claim 2 in which each said opposed torque device is connected to be separately responsive to the indication of one of a pair of oppositely directed sensors.

4. An orientation changing and momentum control apparatus for a satellite body comprising: an elongated rigid gravity-gradient rod having a pivotal connection with said satellite body, and torque motor means for effecting relative angular movement between said elongated rigid rod and said satellite body about said pivotal connection.

* * * * *